(12) United States Patent
Nishizawa et al.

(10) Patent No.: US 7,748,700 B2
(45) Date of Patent: Jul. 6, 2010

(54) SHEET FEEDING DEVICE WITH GOVERNING, ELEVATING, AND RESTRAINING TILTING-TRAY PARTS

(75) Inventors: Seiji Nishizawa, Chuo (JP); Kazuhisa Mochizuki, Minamikoma-gun (JP); Masataka Hamada, Fuefuki (JP)

(73) Assignee: Nisca Corporation, Minamikoma-gun (JP)

( * ) Notice: Subject to any disclaimer, the term of this patent is extended or adjusted under 35 U.S.C. 154(b) by 0 days.

(21) Appl. No.: 11/962,086

(22) Filed: Dec. 20, 2007

(65) Prior Publication Data

US 2008/0150219 A1 Jun. 26, 2008

(30) Foreign Application Priority Data

Dec. 21, 2006 (JP) ............................. 2006-344528
Dec. 21, 2006 (JP) ............................. 2006-344534

(51) Int. Cl.
*B65H 1/08* (2006.01)
(52) U.S. Cl. ..................................................... 271/147
(58) Field of Classification Search ................. 271/147, 271/157
See application file for complete search history.

(56) References Cited

FOREIGN PATENT DOCUMENTS

| JP | 06156749 A | * | 6/1994 |
| JP | 2001-139162 A | | 5/2001 |
| JP | 2001139162 A | * | 5/2001 |
| JP | 2003-118851 A | | 4/2003 |

* cited by examiner

*Primary Examiner*—Patrick Mackey
*Assistant Examiner*—Gerald W McClain
(74) *Attorney, Agent, or Firm*—Judge Patent Associates

(57) ABSTRACT

Sheet feeding device including: a tray unit having a feeding tray for supporting a loaded-on document's trailing end, and a tilting tray for supporting its leading end; a feeding unit that feeds loaded-on documents from off the feeding and tilting trays; and an elevating mechanism that raises/lowers the tilting tray between the positions where documents are set onto and fed from it. The tilting tray is elevated by a lever that comes out of an opening in a feeding-unit cover, in which state the tray unit, which is pivotable with respect to the sheet feeding unit, is kept from pivoting. Otherwise, when the tray unit is pivoted upward from or returned to the load-on document position, tilting-tray movement, in conjunction with the pivoting action, with respect to the feeding tray is restrained.

6 Claims, 9 Drawing Sheets

SHEET FEEDING DEVICE WITH GOVERNING, ELEVATING, AND RESTRAINING TILTING-TRAY PARTS

BACKGROUND OF THE INVENTION

1. Technical Field

The present invention involves sheet-feeding devices that deliver sheets stacked on a sheet feeding tray to a predetermined position, and in particular relates to sheet feeding devices furnished with a tilting tray free to rise/lower in order to bring sheets into pressure-contact with delivery means.

2. Description of the Related Art

In sheet feeding devices provided in image-capturing apparatuses, copiers, or the like, to convey sheets to a predetermined image-capturing position, it is known to dispose the sheet discharging tray below the sheet feeding tray, and to form in the shape of a U the conveying path along which sheets on the sheet feeding tray are conveyed to the sheet discharging tray via the image-capturing position. In this type of sheet feeding device, the sheet feeding tray is pivotable upward so as to take a sheet out from the sheet feeding tray or to remove a sheet jammed in a sheet discharging section.

Meanwhile, a sheet feeding device capable of handling a large number of sheets at a time has been desired. A known feeding device of this type adopts a sheet feeding tray unit composed of a sheet feeding tray that supports the trailing end of a sheet, and a tilting tray free to rise/lower to support a leading end of the sheet (for example, Japanese Unexamined Pat. App. Pub. No. 2003-118851).

The sheet feeding tray unit, composed of the sheet feeding tray and the tilting tray, uses an elevating mechanism including an elevating lever and a driving motor for the elevating lever in order to raise and lower the tilting tray. The elevating mechanism is provided behind the tilting tray. The tilting tray is pivotably supported by the sheet feeding tray at one end and is free at the other end. The elevating lever pushes up the rear side of the tilting tray to raise the tilting tray. The driving motor is reversely rotated to allow the elevating lever to pivot away from the rear surface of the tilting tray, whereby the tilting tray lowers under its own weight.

The system just described controls the tilting tray by receiving a sheet-feeding-command signal from the image-capturing apparatus and actuating the elevating lever to raise the tilting tray from a setting position where sheets are set into place on the tilting tray, to a delivery position where the uppermost one of the sheets abuts against a delivery roller.

However, in the conventional sheet feeding device, the elevating mechanism is fitted integrally to the sheet feeding tray unit. Thus, when the sheet feeding tray unit is to be pivoted, the weight of the elevating mechanism acting on the sheet feeding unit may distort the tray, the pivoting operation might not be able to take place smoothly, or shock on the sheet feeding tray unit when pivoting may occur. The adverse influence of the elevating mechanism's weight has made handling the tray unit challenging.

A sheet feeding device that has been proposed to address this problem has an elevating mechanism made up pf an elevating lever, a driving motor, and associated components, and provided in the main body of the device, the elevating lever having a leading end extending to below the tilting tray (for example, Japanese Unexamined Pat. App. Pub. No. 2001-139162). This configuration resolves the above-described problem because the sheet feeding tray unit is separate from the elevating mechanism.

However, when the sheet feeding tray is swung upward while the tilting tray is rising by being pushed up along the rear surface of the elevating lever, the tilting tray is supported on the sheet feeding tray only at one end and is free at the other end. Furthermore, the elevating lever is exposed from a device cover. Consequently, when the sheet feeding unit is returned to the sheet setting position, there is a chance that the tilting tray may go in underneath the elevating lever. A further danger is that the leading end of the tilting tray may knock against the elevating lever.

Moreover, when the sheet feeding unit is swung, the other, free end of the tilting tray pivots freely, colliding against the sheet feeding tray or other components and making noise. A further problem therein is that the components may be damaged.

BRIEF SUMMARY OF THE INVENTION

The present invention has been made in view of the above-described problems. An object of the present invention is to provide a sheet feeding device having a sheet feeding tray unit including a tilting tray supported by a sheet feeding tray at one end, the device preventing the tilting tray from being affected when the sheet feeding tray unit is caused to pivot upward from the sheet set position or returned to the set position.

The present invention provides a sheet feeding device including a sheet feeding tray unit having a sheet feeding tray on which a sheet-feeding-direction trailing end of a set sheet is supported and a tilting tray which is able to rise and lower freely and which supports a sheet-feeding-direction leading end of the set sheet, a sheet feeding unit having sheet feeding means for feeding the set sheet on the sheet feeding tray and the set sheet on the tilting tray, and elevating means for elevating the tilting tray between a set position where the sheet is set on the tilting tray and a sheet feeding position where the sheet is fed from the tilting tray, the sheet feeding unit being configured to be able to turn freely with respect to the sheet feeding unit.

According to a first aspect of the present invention, the sheet feeding device has means for governing turning of sheet feeding tray unit while the elevating lever elevating the tilting tray is in a raised position.

According to a second aspect of the present invention, the elevating lever is provided in an opening formed in a cover member of the sheet feeding unit. To raise or lower the tilting tray, the elevating lever projects out of the opening to push up and raise the tilting tray.

According to a third aspect of the present invention, the sheet feeding device includes restraining means for restraining movement of the tilting tray with respect to the sheet feeding tray in conjunction with a pivoting action of turning the sheet feeding tray unit with respect to the sheet feeding unit.

This configuration can prevent noise or damage to components which may occur when the sheet feeding tray unit is caused to pivot upward from a sheet set position or returned to the set position, and other possible problems such as movement of the tilting tray to below the elevating lever.

DETAILED DESCRIPTION OF THE INVENTION

Figure 1:
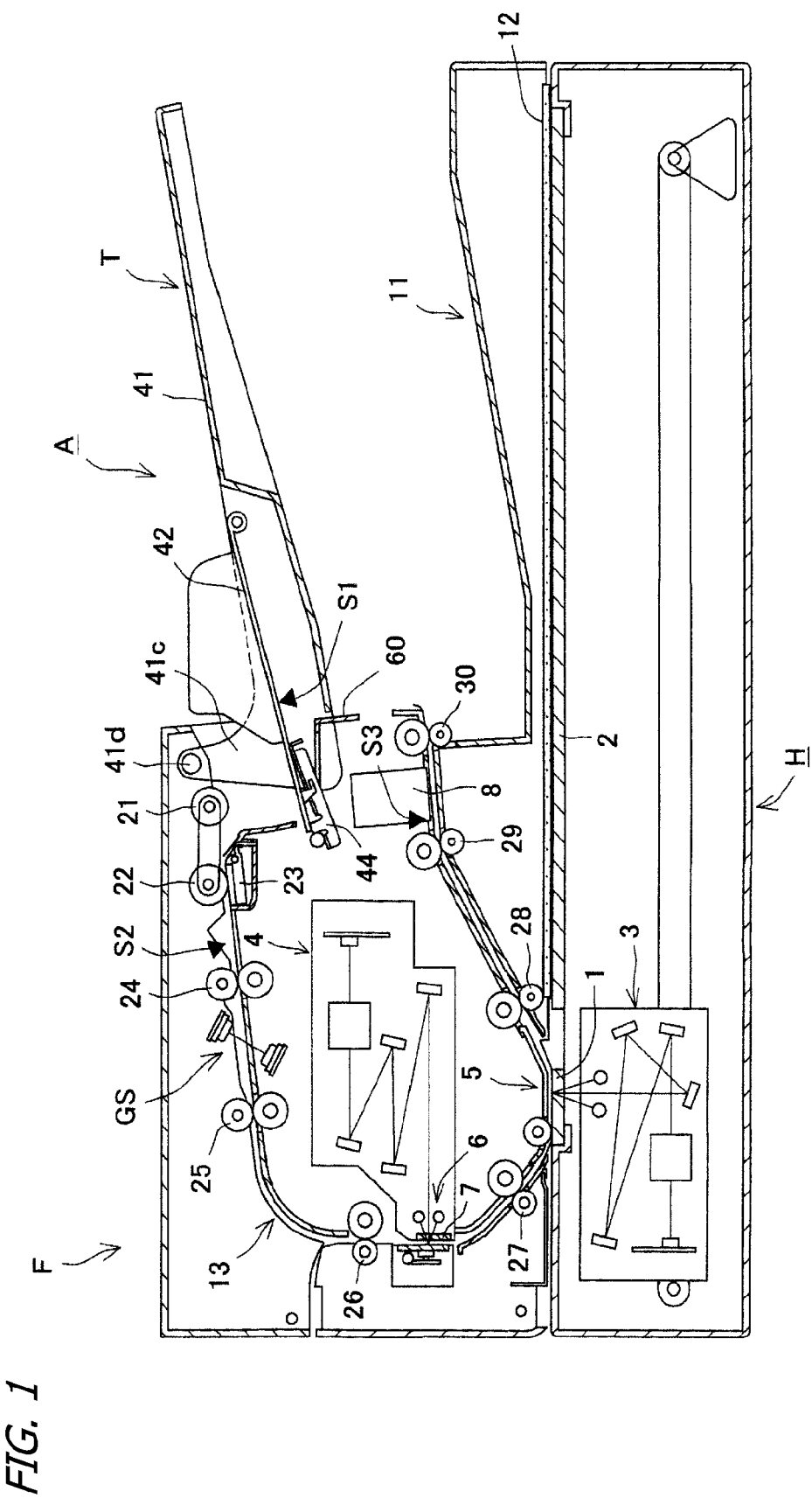
FIG. 1 is a sectional view showing a general configuration of a sheet feeding device according to the present invention.

Embodiments of a sheet feeding device according to the present invention will be described below in detail with reference to the attached drawings. FIG. 1 is a sectional view showing a sheet feeding device according to the present invention mounted in an image-capturing apparatus. In FIG. 1, reference character A denotes a document feeding device as a sheet feeding device mounted at the top of an image-capturing apparatus H. The document feeding device A conveys a document so that the document passes over first contact glass 1 provided on a top surface of the image-capturing apparatus H.

The image-capturing apparatus H comprises a first image-data capturing unit 3 that captures document image data ("image data" herein broadly meant to include text as well as pictographic data) by irradiating a document with light emitted by a light source such as a lamp via the first contact glass 1 so that reflected light from the document is further reflected by a plurality of mirrors, and photoelectrically converting the light by a photoelectric converting means such as a CCD via a lens. A first data-capturing section 5 of the image-capturing apparatus H is thus constructed on a top surface of the contact glass 1. The image-capturing apparatus H comprises second contact glass 2 behind the first contact glass 1. The second contact glass 2 has an area sufficient to place a document thereon. The document image data can be captured by opening the document feeding device A upward, placing a thick document such as a book or a magazine on the second contact glass 2, and moving the first image-data capturing unit 3 in a sub-scanning direction.

The document feeding device A comprises a sheet feeding tray unit T on which a large number of documents can be placed at a time, a sheet discharging tray 11 in which documents from which document image data has been captured by the image-capturing apparatus H are housed, a pressing cover 12 that presses the second contact glass 2, and a U-shaped conveying path 13 along which each of the documents is conveyed from the sheet feeding tray unit T to the sheet discharging tray 11. The pressing cover 12 is composed of, for example, a porous member such as sponge and a film member such as a white Mylar™ resin.

The document feeding device A according to the present embodiment has a second image-data capturing unit 4 installed at a bent portion of the U-shaped conveying path 13 to capture an image data from a back surface of a document. Like the first image-data capturing unit 3, the second image-data capturing unit 4 captures document image data by irradiating a document with light emitted by a light source such as a lamp via contact glass 7, forming a part of the conveying path 13, so that reflected light from the document is further reflected by a plurality of mirrors, and photoelectrically converting the light by a photoelectric converting means such as a CCD via a lens. A top surface of the contact glass 7 is configured as a second data capturing section 6 of the image-capturing apparatus H. Thus, in the document feeding device A, the second image-data capturing unit 4 captures document image data from one surface of the document passing through the second data capturing section 6, located in the middle of the conveying path 13. The first image-data capturing unit 3 captures document image data from the other surface of the document passing through the first data capturing section 5. This enables a sharp reduction in the time required to capture image data from double-side documents.

The U-shaped conveying path 13 comprises a delivery roller 21 that delivers a document from the sheet feeding tray unit T, separating means made up of a sheet feeding roller 22 and a separating pad 23 to separately feed each of the documents delivered from the delivery roller 21, and a registration roller pair 24 having a nip point against which the leading end of the document fed from the sheet feeding roller 22 abuts and is aligned for de-skewing, the registration roller pair 24 being subsequently driven to feed the document downstream. The conveying path 13 comprises a feeding roller pair 25 that feeds the document from the registration roller pair 24 out to the second data capturing section 6 and the first data capturing section 5, a first data-capturing roller pair 26 that feeds the document from the feeding roller pair 25 to the second data capturing section 6, and a second data-capturing roller pair 27 that feeds the document from one surface of which image data has been captured, to the first data capturing section 5. The conveying path 13 further comprises a third data-capturing roller pair 28 that carries out the document having passed through the second data capturing section 6 and the first data capturing section 5, a first sheet discharging roller 29 which receives the document from both surfaces of which image data has been captured, from the third data-capturing roller pair 28 and which conveys the document toward the sheet discharging tray 11, and a second sheet discharging roller pair 30 that discharges the document to the sheet discharging tray 11. In the present embodiment, the conveying path 13 is configured as a sheet feeding unit F incorporating a plurality of components.

Now, description will be given of a document conveying operation of the document feeding device A configured as described above. First, an empty sensor S1 senses that a document has been placed on the sheet feeding tray unit T In response to a sheet feeding command signal from the image-capturing apparatus H, the delivery roller 21 and the sheet feeding roller 22 are driven. In this way, a plurality of documents having been placed on the sheet feeding tray unit T are sequentially delivered, and each of the documents is separated from the others by the separating pad 23 and fed. The registration sensor S2 senses the leading end of the fed document, which is conveyed a predetermined distance from the point corresponding to the sensing. The leading end of the document abuts against the nip portion of the registration roller pair 24 for alignment and de-skewing. Subsequently, the registration roller pair 24, the feeding roller pair 25, and the data-capturing roller pairs 26, 27, and 28 are driven. Thus, the document is conveyed along the U-shaped conveying path 13 so as to be turned upside down. The document passes through the second data capturing section 6 and the first data capturing section 5 in this order. When the document passes through the second data capturing section 6, image data is captured from one surface of the document. When the document passes through the first data capturing section 5, image data is captured from the other surface of the document.

Before the leading end of the document reaches the first sheet discharging roller pair 29, the first sheet discharging roller pair 29 and the second sheet discharging roller pair 30 have been driven to discharge, onto the sheet discharging tray 11, the document from the opposite surfaces of which image data has been captured by the second data capturing section 6 and the first data capturing section 5.

It should be noted that in the above-described document feeding device A, a shingle-feed detecting sensor GS is provided in the course of the conveying path 13 between the registration roller pair 24 and the feeding roller pair 25. The shingle-feed detecting sensor GS, having an oscillating unit for emitting ultrasonic waves and a receiving unit for receiving the ultrasonic waves, arranged opposing each other across the path, detects that "shingle-feeding" of documents on the basis of the vibration level of the received ultrasonic waves. Furthermore, an imprinter 8 is provided in a sheet discharging section on a sheet discharging tray 11 side of the conveying path 13. The imprinter 8 can print about five letters on the surface of the document discharged by the first sheet discharging roller 29 and the second sheet discharging roller 30. The imprinter prints letters indicating that a document conveying error or a data-capturing error in the first or second image-data capturing unit 3 or 4 has occurred, on the document on which the error has occurred.

Figure 2:
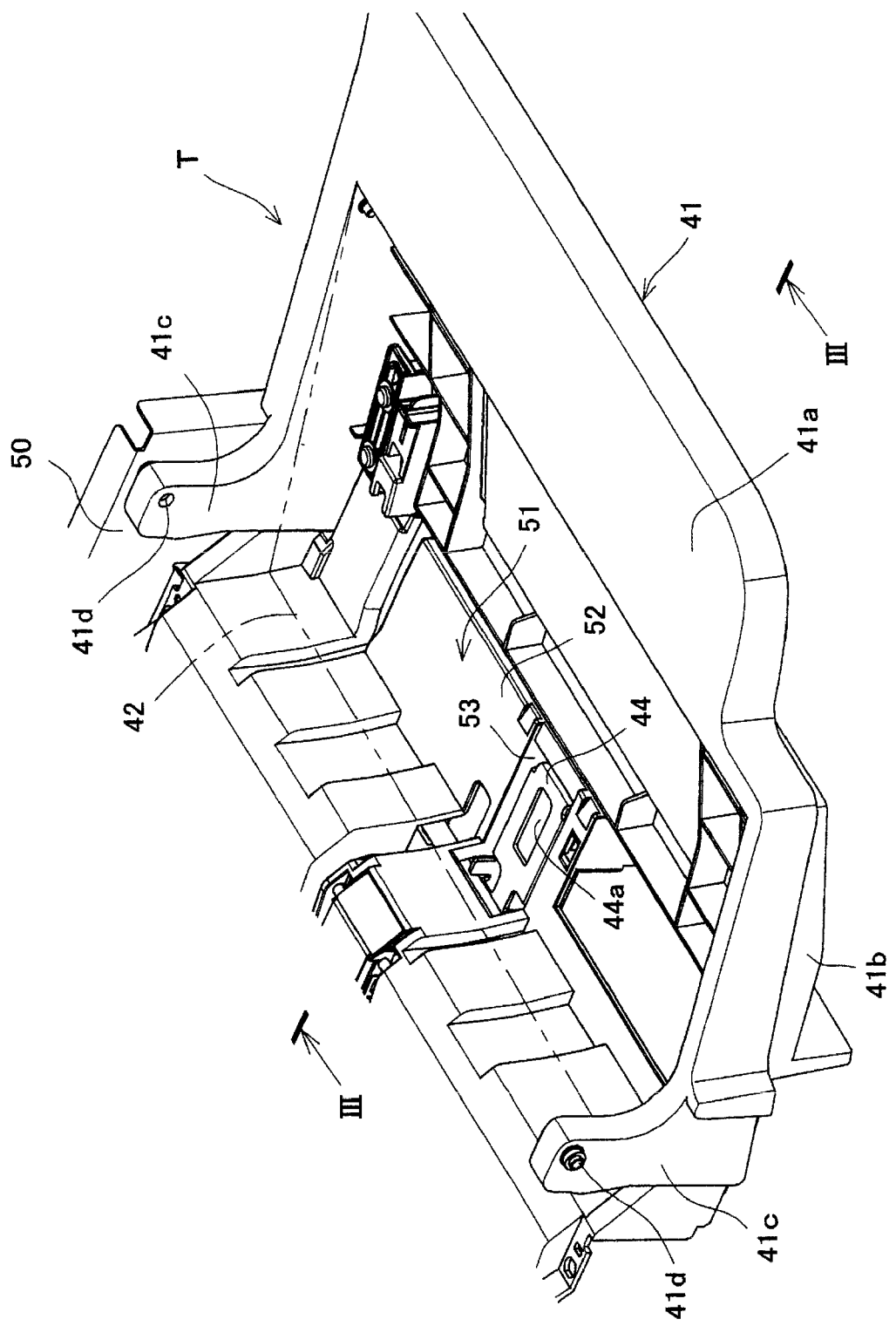
FIG. 2 is a perspective view of a sheet feeding tray unit of the document feeding device according to the present invention.
Figure 3:
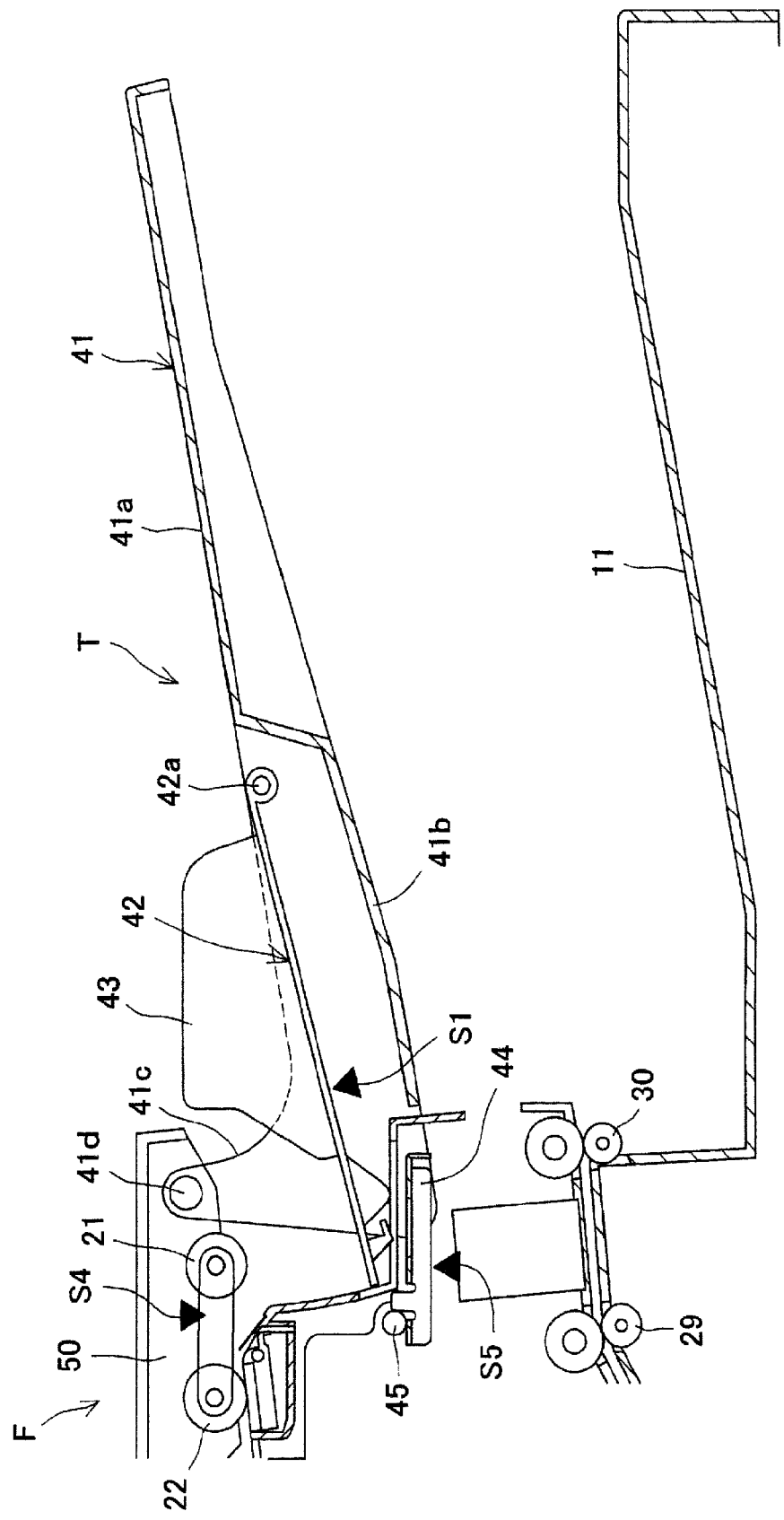
FIG. 3 is a sectional view taken along line III-III in FIG. 2.
Figure 4:
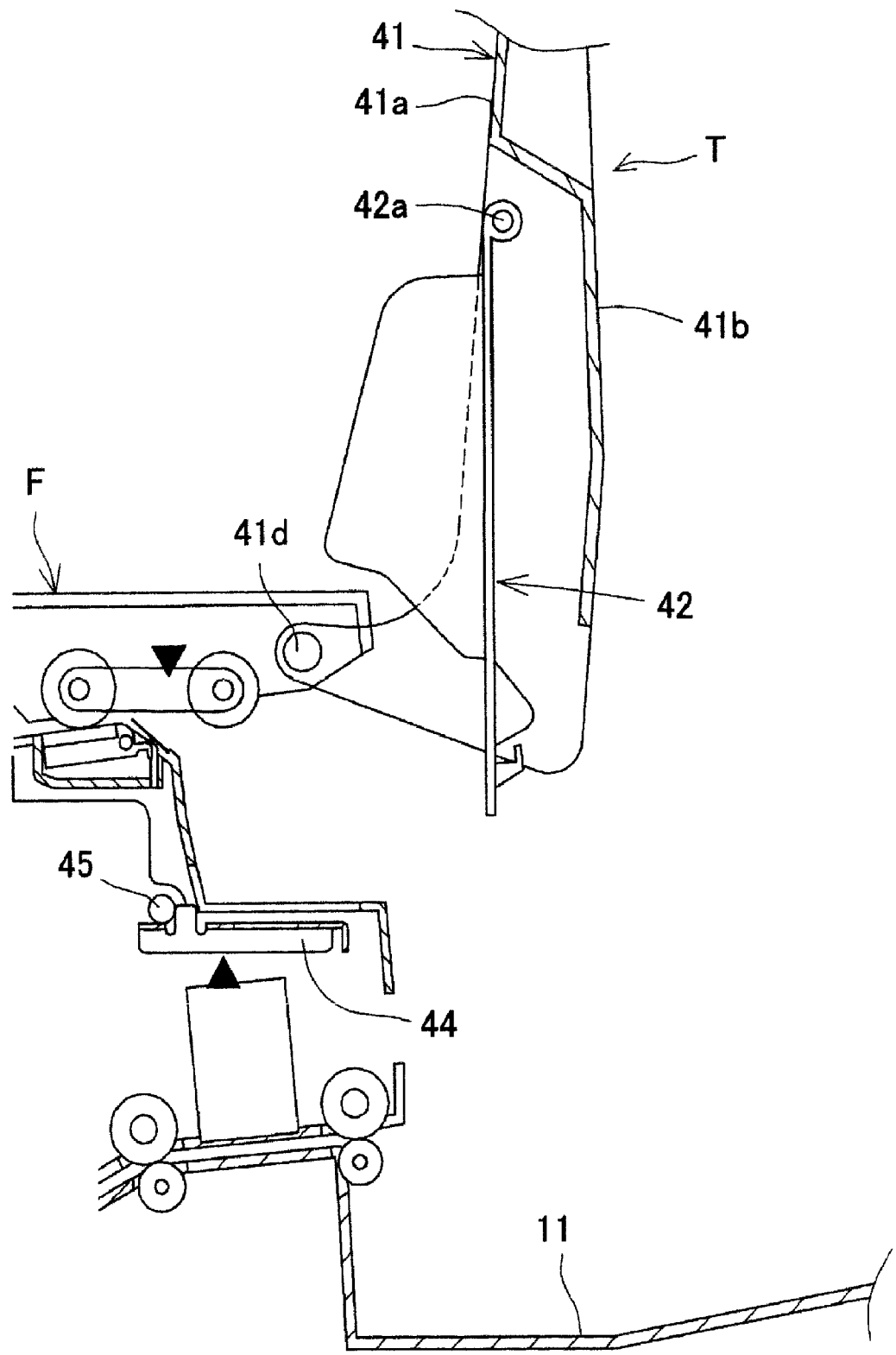
FIG. 4 is a sectional view showing that a sheet feeding tray has been caused to pivot upward.

Now, description will be given of the configuration and effects of the sheet feeding tray unit T according to the present invention. FIG. 2 is a perspective view illustrating the configuration of the sheet feeding tray unit T. FIG. 3 is a sectional view of the sheet feeding tray unit T.

As shown in FIGS. 2 and 3, the sheet feeding tray unit T according to the present invention is made up of a sheet feeding tray 41 that supports the trailing end of the document, a tilting tray 42 that supports the leading end of the document. The sheet feeding tray 41 has a planar document loading section 41*a*, a cover section 41*a* that covers a bottom surface of the tilting tray 42, and an arm section 41*c* that causes the sheet feeding tray unit T to pivot upward; the cover section 41*b* and the arm section 41*c* are formed integrally with the document loading section 41*a*. The tilting tray 42 is made up of a planar member located above the cover section 41*b* of the sheet feeding tray 41. The tilting tray 42 is continuous with the document loading section 41*a* of the sheet feeding tray 41 to form a loading surface for the leading end of the document. Furthermore, support pins 42*a* provided at respective ends of a trailing end of the tilting tray 42 are rotatably attached to the sheet feeding tray 41. Thus, the tilting tray 42 rises and lowers between a loading position where the tilting tray 42 cooperates with the document loading section 41*a* of the sheet feeding tray 41 in forming a continuous flat surface on which the document is loaded as shown in FIG. 3, and a delivery position where a front side of the tilting tray is raised using the support pins 42*a* as support points so as to contact the top surface of the document with a peripheral surface of the delivery roller 21.

The cover section 41*b* of the sheet feeding tray 41 covers the bottom surface of the tilting tray 42 to prevent the possible exposure of an interlocking mechanism of a pair of side governing members 43 described below and an elevating lever 44 that raises the tilting tray 42. Furthermore, as shown in FIG. 2, the arm section 41*c* has a pivoting pin 41*d* at a leading end thereof and pivotably attached to a side wall 50 of the sheet feeding unit F constituting the U-shaped conveying path 13. Thus, in the sheet feeding tray unit T, the sheet feeding tray 41 and the tilting tray 42 can pivot together around the pivoting pin 41*d*, serving as a support point, in a vertical direction with respect to the sheet feeding unit F. The sheet feeding tray unit T is caused to pivot upward, for example, when documents discharged onto the sheet discharging tray 11 are taken out or when a jammed document is removed.

The tilting tray 42 has the pair of side governing members 43 that govern side ends of the document in a width direction. The side governing members 43 are slidable in the width direction of the document so as to govern the opposite widthwise side ends of the document. The side governing members 43 have the interlocking mechanism that allows one of the side governing members to move slidably in conjunction with the other side governing member. Although not shown, the interlocking mechanism is common and has a rack and a pinion.

The tilting tray 42 is drivingly raised and lowered by elevating means provided in the sheet feeding unit F. In the present embodiment, the elevating means is composed of: an elevating lever 44 that abuts against a rear surface of the leading end of the tilting tray 42; a driving shaft 45 that swings the elevating lever 44 up and down; a plurality of gears (not shown) as transmission means which are coupled to the driving shaft 45; and an elevating motor (not shown) that rotates the driving shaft 45 via the plurality of gears. As shown in FIG. 2, the elevating lever 44 is a plate member having an engagement hole 44*a* formed in a central portion thereof, and a leading end of the elevating lever 44 extends to immediately below the leading end of the tilting tray 42 and abuts against a rear surface 42*b* (cf. FIGS. 5A and 5B) of the tilting tray 42; the engagement hole 44*a* will be described below.

The elevating operation of the tilting tray 42 will be described below. The empty sensor S1 detects a document loaded on the sheet feeding tray unit T. In response to a sheet feeding command signal from the image-capturing apparatus H, the elevating motor starts forward rotational driving. The forward rotational driving by the motor rotates the driving shaft 45 to cause the elevating lever 44 located at a lower limit position to pivot upward. The pivoting operation causes the leading end of the elevating lever 44 to abut against the rear surface 42*b* of the tilting tray 42 to push up the tilting tray 42. On the basis of this operation, the leading end of the tilting tray 42 is raised using the support points 42*a* at the trailing end as pivoting support points. The elevating motor stops the driving when the tilting tray 42 rises up to the delivery position where the uppermost surface of the documents loaded on the tilting tray 42 abuts against the delivery roller 21. In this condition, the delivery roller 21 is driven to deliver the document.

Following that, on each occasion documents have been delivered a predetermined number times, the elevating motor runs, whereby the elevating lever 44 raises the tilting tray 42, which is controlled so that the uppermost surface of the documents is always set at the appropriate delivery position. When the empty sensor S1 detects that no document is present on the sheet feeding tray unit T, the elevating motor starts backward rotational driving. The elevating lever 44 thus pivots downward via the driving shaft 45 to move to the lower limit position. Following on the downward pivoting of the elevating lever 44, the tilting tray 42 under its own weight lowers to the lower loading position. Now, reference numeral S4 denotes a delivery-position detecting sensor that detects that the uppermost surface of the documents has reached the delivery position, while reference numeral S5 denotes a lower-limit position sensor that detects that the elevating lever 44 has moved to the lower limit position. Herein, engaging a projection (not shown) provided on the rear surface of the tilting tray 42 with the engagement hole 44*a*, which is provided in the elevating lever 44, makes it possible to restrain the sheet feeding tray unit T from pivoting upward when elevating lever 44 is rising.

Figure 5A:
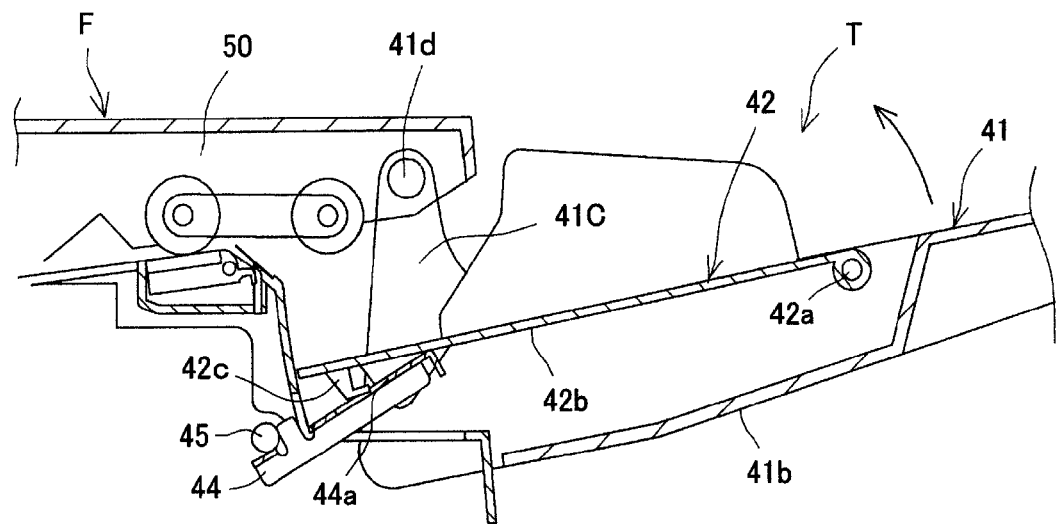
FIG. 5 is a sectional view showing that governing means prevents the sheet feeding unit from pivoting upward.
Figure 5B:
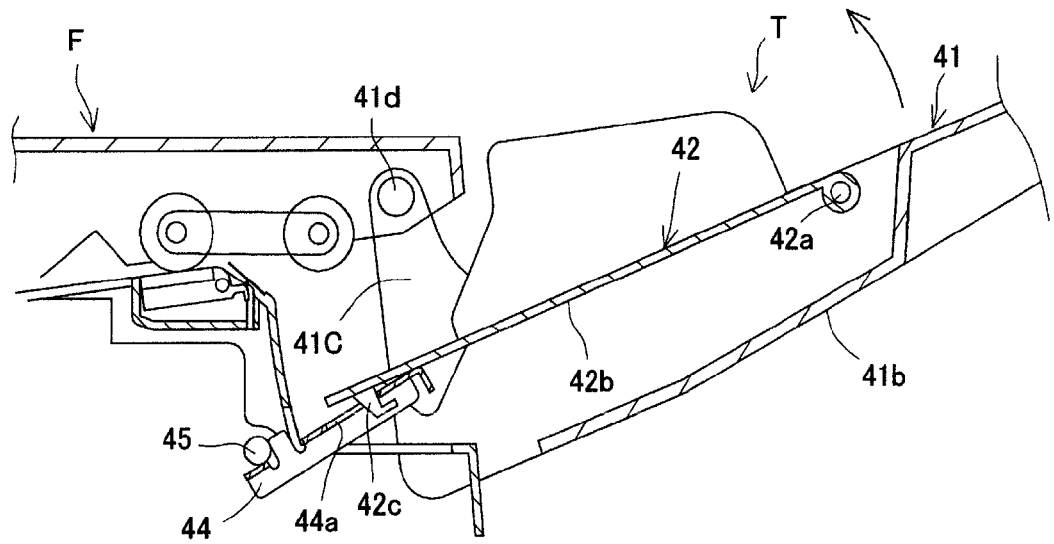

The document feeding device A has governing means for governing the upward pivoting of the sheet feeding tray unit T while the tilting tray 42 lies above the document-loading position. As shown in FIG. 5, the governing means includes an engaging piece 42c formed on the rear surface 42b of the leading end of the tilting tray 42 so as to project downward, and the engagement hole 44a, which is rectangular, formed in the central portion of the elevating lever 44. When the sheet feeding tray unit T is caused to pivot, the engaging piece 42c engages the engagement hole 44a to restrain the upward pivoting of the sheet feeding tray unit T. The leading end of the engaging piece 42c is bent like a key so as to easily engage an end of the engagement hole 44a. It is important that the engaging piece 42c and the engagement hole 44a be in a positional relationship such that while the tilting tray 42 lies above the loading position, the engaging piece 42c and the engagement hole 44a are engaged with each other by causing the sheet feeding tray unit T to pivot. For example, the engaging piece 42c and the engagement hole 44a may be in a positional relationship such that, as shown in FIG. 5A, when the leading end of the elevating lever 44 abuts against the rear surface 42b of the tilting tray 42, the engaging piece 42c enters the engagement hole 44a to raise the tilting tray 42, or such that the engaging piece 42c does not enter the engagement hole 44a while the tilting tray 42 lies above the loading position but, as shown in FIG. 5B, engages into the engagement hole 44a when the sheet feeding tray unit T is caused to pivot in the direction of an illustrated arrow. As shown in FIG. 5B, when the sheet feeding tray unit T is caused to pivot, the engaging piece 42c projecting from the rear surface 42b of the tilting tray 42 engages the end of the engagement hole 44a in the elevating lever 44 in the pivoting direction to inhibit the sheet feeding tray unit T from pivoting further.

Figure 6:
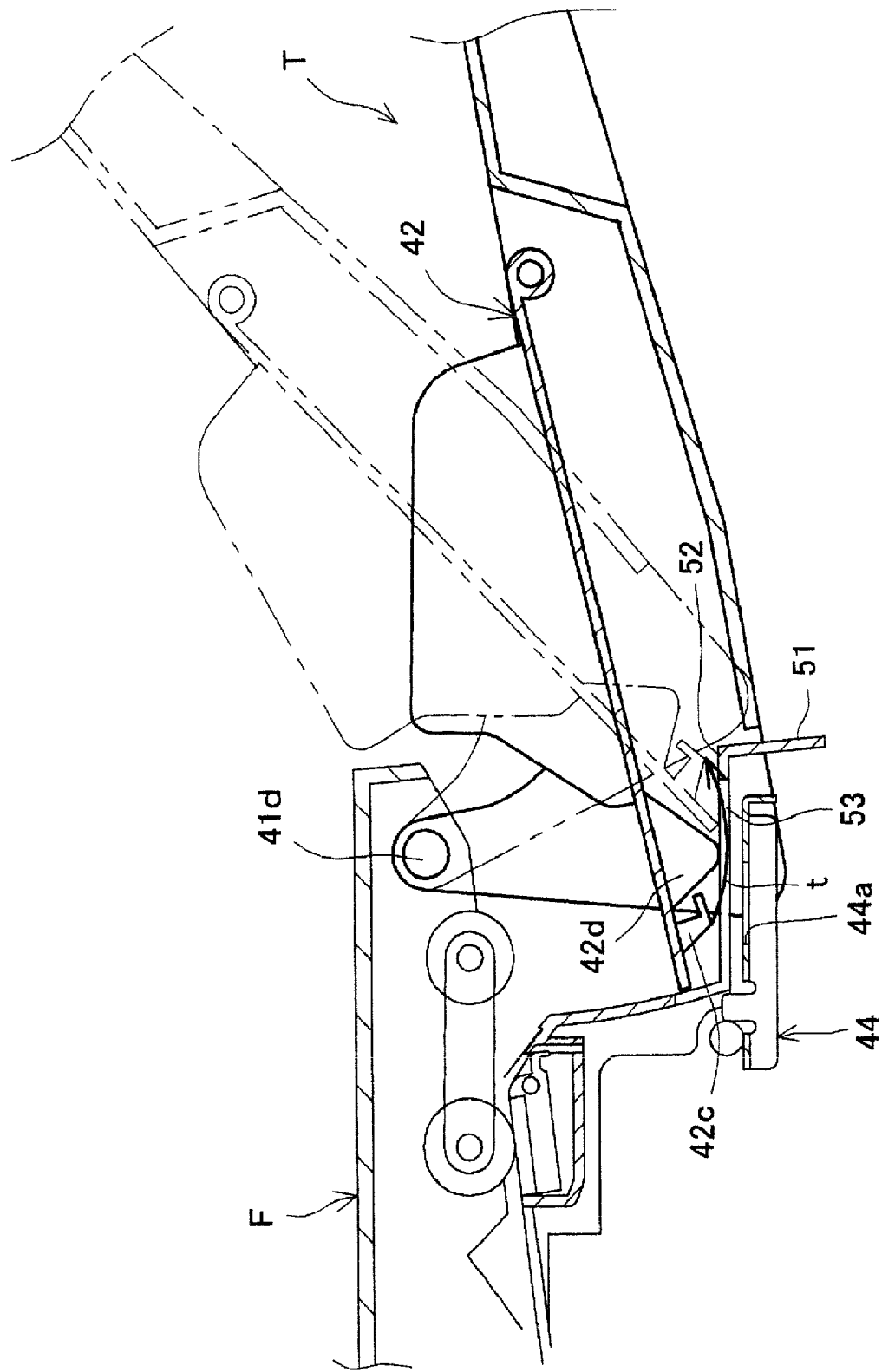
FIG. 6 is a sectional view showing that the governing means is released to allow the sheet feeding tray unit to pivot upward.

On the other hand, as shown in FIG. 6, when the elevating lever 44 moves to the lower limit position, the tilting tray 42 is set in the loading position where the tray 42 cooperates with the document loading section 41a of the sheet feeding tray 41 in forming a flat surface. Then, even when the sheet feeding tray unit T is caused to pivot in the direction of the arrow, the sheet feeding tray unit T pivots from the roughly horizontal position shown in solid lines in FIG. 6 to an almost vertical position, shown in phantom in the figure, without being inhibited from pivoting because the engagement hole 44a in the elevating lever 44 lies off the pivoting trajectory t of the engaging piece 42c, projecting from the rear surface 42b of the tilting tray 42. Even when the leading end of the elevating lever 44 abuts against the rear surface 42b of the tilting tray 42, the pivoting of the sheet feeding tray unit T is not inhibited provided that the engagement hole 44a lies off the pivoting trajectory t of the engaging piece 42c.

The governing means has a simple configuration but exerts the following effect. The governing means reliably inhibits the pivoting of the sheet feeding tray unit T while the tilting tray 42 is in the predetermined delivery position. On the other hand, the governing means allows the sheet feeding tray unit T to pivot only when the tilting tray 42 is in the loading position. This prevents the tilting tray from slipping under the elevating lever or colliding against the elevating lever when the tilting tray having pivoted upward is returned to the initial position.

The document feeding device A according to the present invention comprises a cover member 51 in which the elevating lever 44 located in the lower limit position is housed. An outer cover for the sheet feeding unit F, located below the tilting tray 42, is utilized as the cover member 51. The cover member 51 has a planar portion 52 provided below the tilting tray 42 and having a rectangular opening 53 which is formed in the planar portion 52 and in which the elevating lever 44 is housed. The elevating lever 44 is housed in the opening 53 so as to be able to move into and out of the opening 53. The elevating lever 44 is housed in the opening 53 when in the lower limit position and projects from the opening 53 toward the rear surface 42b of the tilting tray 42 during operation. Thus, during a normal standby condition, the tilting tray 44 is housed in the cover member 51 and prevented from sticking out to the vicinity of the sheet discharging tray even when the sheet feeding tray unit T is caused to pivot upward. Consequently, the elevating lever 44 does not interfere with the operation when a document is taken out of the sheet discharging tray or when a jammed document is removed from the sheet discharging section.

A projection 42d is provided at the leading end of the rear surface 42b of the tilting tray 42. Then, when the elevating cover 44 is housed in the cover member 51, the projection 42d abuts against the planar portion 52 of the cover member 51. This holds the tilting tray 42 in the loading position.

The document feeding device A has restraining means for preventing the tilting tray 42 from being shaky on the sheet feeding tray 41 when the sheet feeding tray unit T is caused to pivot upward. As shown in FIG. 7, the restraining means comprises an engaging projection 60 projectively formed on the rear surface of the leading end of the tilting tray 42 and serving as an engaging member, a restraining member 61 attached to the cover section 41b of the sheet feeding tray 41 and serving as an engaged member. When the sheet feeding tray unit T is caused to pivot, the restraining member 61 engages the engaging projection 60 to prevent a free end of the tilting tray 42 from swinging. A key-like hook 60a is formed at a leading end of the engaging projection 60. In the present embodiment, the engaging projection 60 is formed integrally with the tilting tray 42 using resin.

Figure 7A:
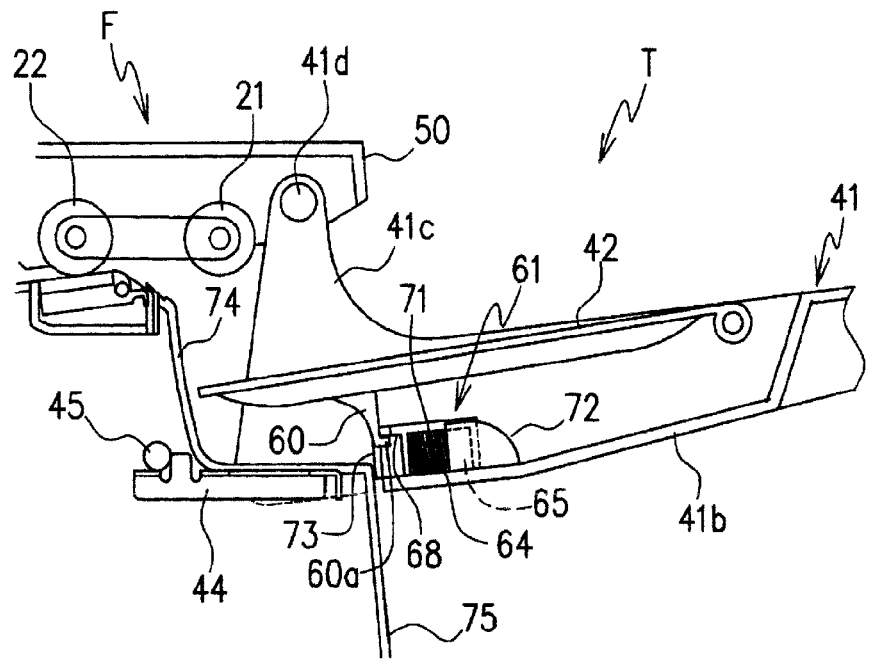
FIG. 7 is a sectional view showing the engagement relationship between an engaging projection and a restraining member.
Figure 7B:
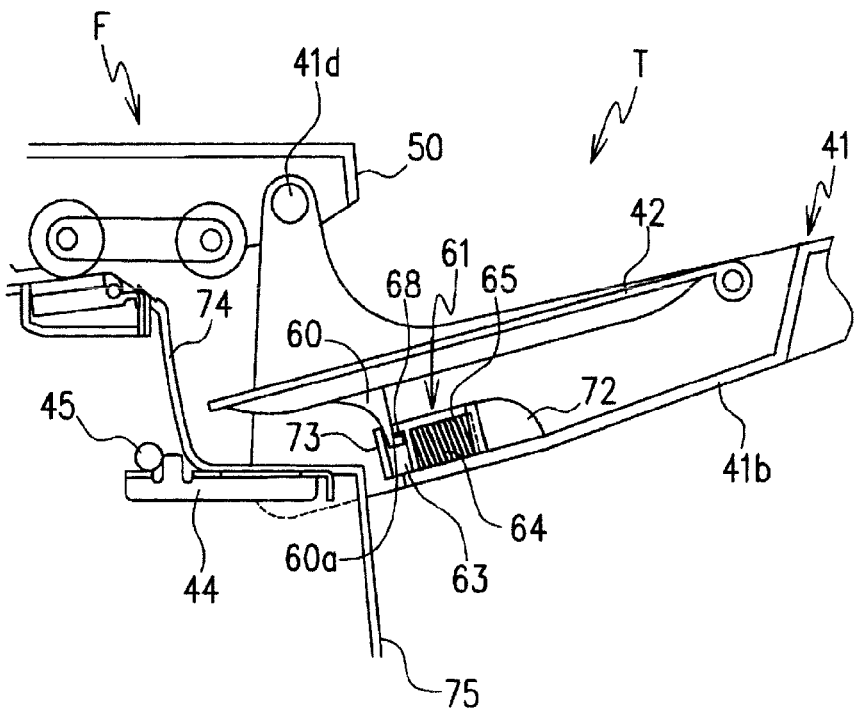
Figure 8A:
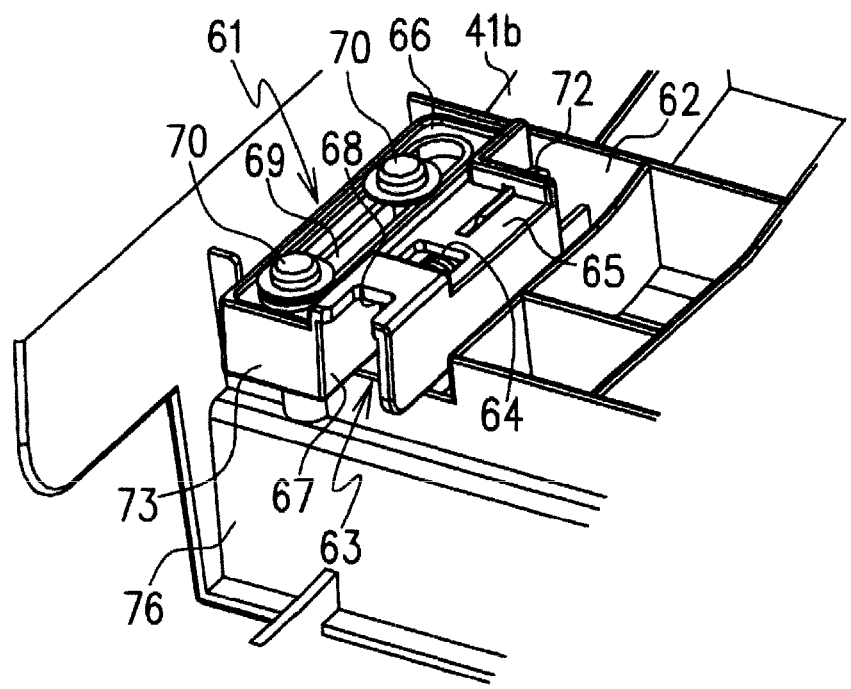
FIG. 8 is a perspective view showing the configuration of the governing member.
Figure 8B:
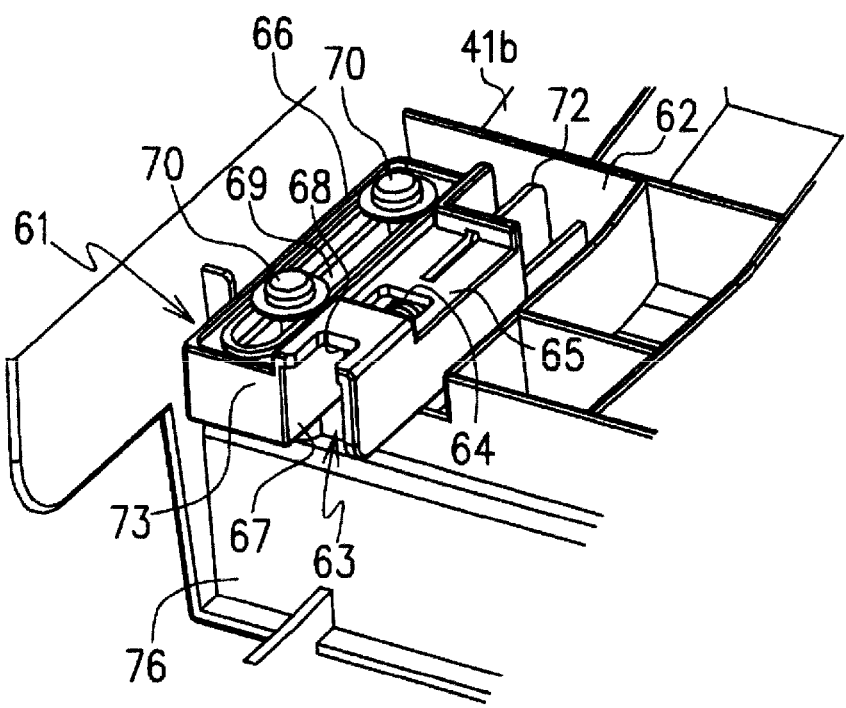

The restraining member 61 is such a block-like resin molded article as shown in FIGS. 7 and 8 and is located in a recess 62 formed in a corner of the cover 41b at a front end thereof. In the present embodiment, the restraining member 61 comprises an engaging recess 63, a housing section 65 which is located behind the engaging recess 63 and in which a compression spring 64 always biasing the restraining member 61 toward the engaging projection 60 is housed, and a slide section 66 that supports the restraining member 61 so that the restraining member 61 is slidable forward and backward relative to the cover section 41a of the sheet feeding tray 41. The engaging recess 63 is composed of an engaging groove 67 into which the engaging projection 60 is fitted and an engaging top wall 68 which is located above the engaging groove 67 and which engages a hook 60a at the leading end of the engaging projection 60. Furthermore, a slot 69 extending in a front-rear direction is formed in the slide section 66. Two stepped screws 70 arranged in the slot 69 are attached to the cover section 41b of the sheet feeding tray 41 to slidably support the restraining member 61. Moreover, the compression spring 64 is compressed while housed in the housing section 65 with a front end thereof abutting against a front wall 71 of the engaging recess 63 and a rear end thereof abutting against a rib-like projecting wall 72. That is, as shown in FIGS. 7A and 8A, when the sheet feeding tray unit T is in the position where a document is delivered from the sheet feeding tray unit T, a vertical wall surface 75 of an outer cover 74 in which the elevating lever 44 is housed presses a front surface 73 of the slide section 66 of the restraining member 61. This allows the compression spring 64 to be contracted inside the housing section 65. The restraining member 61 is thus pushed back into the recess 62. At this time, the hook 60a of the engaging projection 60 is fitted into the engaging groove 67 away from the engaging top wall 68 of the engaging recess 62 in the restraining member 61. On the other hand, as shown FIGS. 7 and 8B, when the sheet feeding tray unit T pivots upward, the front surface 73 of the slide section 66 of the restraining member 61 is released from the pressure of the vertical wall surface 75 of the outer cover 74. The elastic force of the compression spring 64 causes the restraining member 61 to slide forward. A front surface 73 of the slide section 66 thus projects out from a front end 76 of the recess 62. At this time, the hook 60a of the engaging projection 60 engages the engaging top wall 68 of the engaging recess 62 in the restraining member 61. In the present embodiment, the vertical wall surface 75 of the outer cover 74 serves as the pressing member pushing the restraining member 61 back into the recess 62. However, the pressing member according to the present invention is not limited to this.

Now, the effects of the restraining means configured as described above will be described below with reference to FIGS. 7 and 9. FIG. 7A shows that the sheet feeding tray unit T is in the position where a document is loaded on the sheet feeding tray unit T. In this condition, the front surface 73 of the slide section 65 abuts against the vertical wall surface 75 of the outer cover 74 of the sheet feeding unit F to press the restraining member 61 away from the engaging projection 60, projectively formed on the rear surface of the tilting tray 42. This pressing operation allows the restraining member 61 to be fitted into the recess 62 in the sheet feeding tray 41 to disengage the hook 60a at the leading end of the engaging projection 60 from the engaging top wall 68, provided in the engaging recess 63 in the restraining member 61. This enables the tilting tray 42 to be raised or lowered by the elevating lever 44.

FIG. 7B shows that the sheet feeding tray unit T has started pivoting from the loading position. In this case, the front surface 73 of the slide section 66 leaves the vertical wall surface 75 of the outer cover 74 to releases the pressure acting on the vertical wall surface 7. The elastic force of the compression spring 64 slides the restraining member 61 to cause the front surface 73 of the slide section 66 to project from the front end 76 of the recess 62. The restraining member 61 thus approaches the engaging projection 60 to engage the leading end hook 60a of the engaging projection 60 with the engaging top wall 68, provided for the engaging recess 63 in the restraining member 61.

Figure 9:
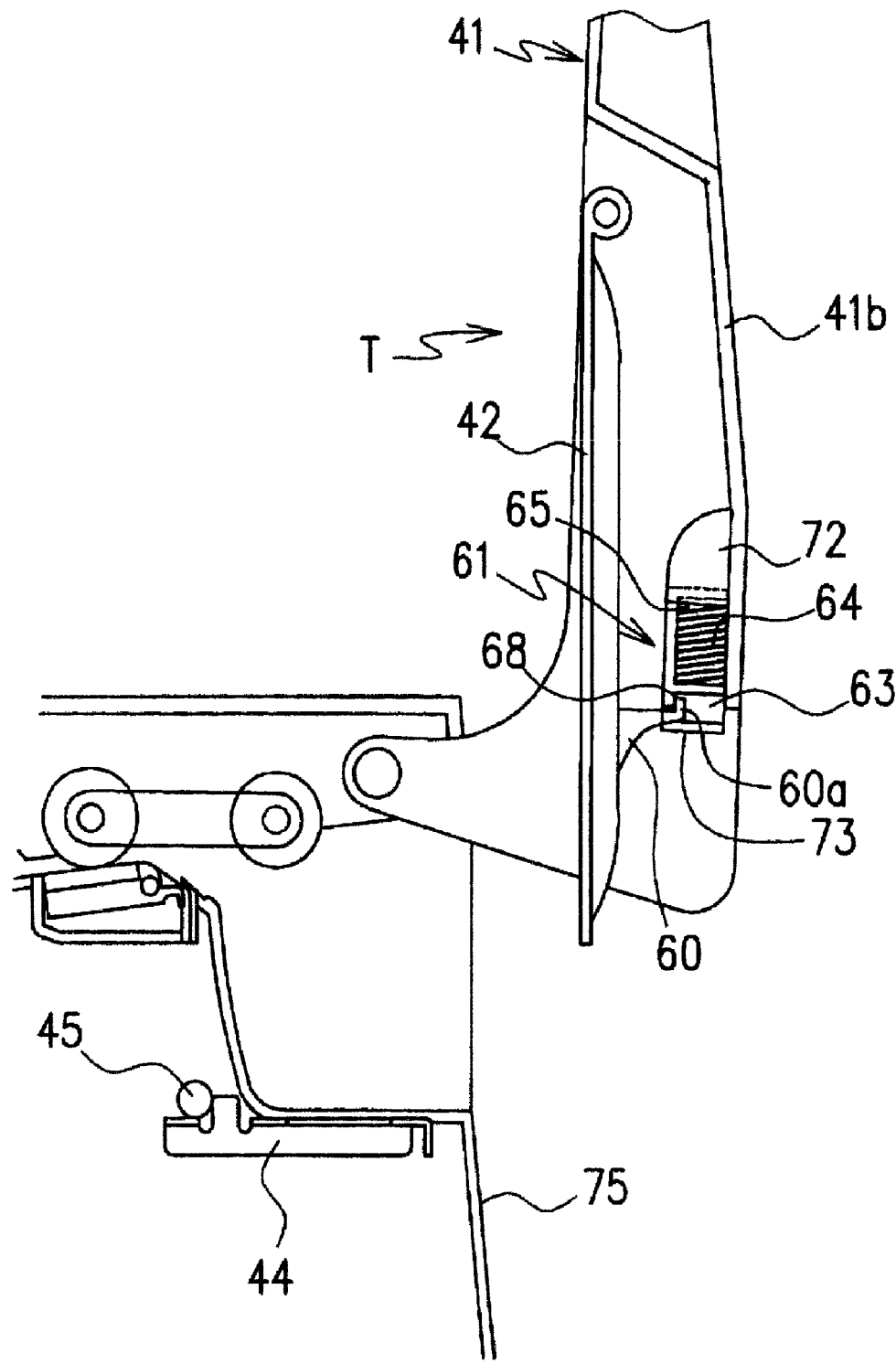
FIG. 9 is a sectional view showing that the sheet feeding tray unit has been caused to pivot upward.

FIG. 9 shows that the sheet feeding tray unit T has pivoted from the above-described position to the vertical position. While the sheet feeding tray unit T is pivoting toward the vertical position and after the sheet feeding tray unit T is almost set in the vertical condition, the engaging projection 60 remains engaged with the restraining member 61. Thus, the lower end of the tilting tray 42, corresponding to a free end, is inhibited from swinging. This prevents the tilting tray 42 from colliding against the sheet feeding tray 41 to make noise.

Then, the sheet feeding tray unit T is returned from the vertical position in FIG. 9 to the loading position shown in FIG. 7A. The front surface 73 of the slide section 66 abuts against the vertical wall surface 75 of the outer cover 74 to slidably move the restraining member 61 away from the engaging projection 60. The engaging projection 60 is thus disengaged from the restraining member 61 to allow the tilting tray 42 to be raised and lowered again.

While the tilting tray 42 is elevating, the engaging projection 60 is positioned above the restraining member 61. This misaligns the hook 60a of the engaging projection 60 and the engaging recess 63 in the restraining member 61 in the vertical direction. Thus, even if the sheet feeding tray unit T is caused to pivot to release the restraining member 61 from the pressure to allow the restraining member 61 to project toward the engaging projection 60, the hook 60 of the engaging projection 60 may not be fitted into the engaging recess 63 in the restraining member 61. Thus, in this condition, when the sheet feeding tray unit T is caused to pivot, the tilting tray 42 pivots with the lower end thereof unrestrained, together with the sheet feeding tray unit T. This makes the tilting tray 42 shaky.

According to the present invention, to avoid the above-described situation, a plurality of step-like engaging recesses 63 arranged in a height direction, that is, in a direction in which the tilting tray rises and lowers, may be formed in the restraining member 61 so that if the sheet feeding tray unit T is caused to pivot while the tilting tray 42 is elevating, the engaging projection 60 engages one of the engaging recesses 63. As previously described, in the present embodiment, while the tilting tray 42 is elevating, the sheet feeding tray unit T is restrained so as not to be able to pivot.

With the above-described configuration, the restraining means, having the simple structure, allows the tilting tray 42 to rise and lower while the sheet feeding tray unit T is in the position in which the document is delivered from the tray unit T. On the other hand, the restraining means can inhibit the tilting tray 42 from swinging while the sheet feeding tray unit T is pivoting.

In the above description of the embodiment, the sheet feeding device according to the present invention is applied to the document feeding device by way of example. However, of course, the present invention is not limited to the document feeding device.

This application claims priority rights from Japanese Pat. App. Nos. 2006-344528 and 2006-344534, both filed on Dec. 21, 2006, the disclosures of which are incorporated by reference.

While the invention has been explained with reference to specific embodiments thereof, the explanation is illustrative; the scope of the invention is defined only by the appended claims.

What is claimed is:

1. A sheet feeding device for feeding sheets to a predetermined processing position, the device comprising:
 a sheet feeding tray having a sheet loading surface for carrying the sheet-feeding-direction trailing end of sheets;
 a tilting tray attached to said sheet feeding tray and being free to rise and lower, said tilting tray having a sheet loading surface for carrying the sheet-feeding-direction leading end of sheets;
 a sheet feeding unit having sheet feeding means for feeding sheets off said sheet feeding tray and said tilting tray;
 support means for supporting pivotably with respect to said sheet feeding unit and with said tilting tray and said sheet feeding tray united, the sheet-feeding-direction downstream end of said sheet feeding tray;
 elevating means for raising and lowering the tilting tray between a sheet loading position in which sheets are loaded onto said sheet feeding tray and said tilting tray, and a sheet feeding position in which sheets are fed from said sheet feeding tray and said tilting tray, said elevating means having an elevating lever provided on said sheet feeding unit and abutting against a rear surface of said tilting tray to raise said tilting tray, said elevating lever to abut against the rear surface of said tilting tray projecting out of an opening formed in a cover member for said sheet feeding unit, provided beneath said tilting tray, and said elevating lever being housed into the opening in the cover member when said tilting tray has lowered into the sheet loading position; and governing means for enabling, when said tilting tray is in the sheet loading position, the pivoting of said sheet feeding tray upward, and for governing the pivoting of said sheet feeding tray upward when by means of said elevating lever said tilting tray is in the sheet feeding position, said governing means therefor comprising a projecting portion provided on the rear surface of said tilting tray, and an engagement portion provided on said elevating lever, wherein the projecting portion engaging with the engagement portion by the pivoting action of said tilting tray governs the pivoting of said tilting tray.

2. The sheet feeding device according to claim 1, further comprising a housing tray provided beneath either said sheet feeding tray or said tilting tray, for housing sheets processed at the processing position.

3. The sheet feeding device according to claim 1, further comprising restraining means for restraining movement, in conjunction with the pivoting action of said sheet feeding tray, of said tilting tray with respect to said sheet feeding tray.

4. A sheet feeding device for feeding sheets to a predetermined processing position, the device comprising:

a sheet feeding tray having a sheet loading surface for carrying the sheet-feeding-direction trailing end of sheets;

a tilting tray, one end of which is pivotally attached to said sheet feeding tray, and being free to rise and lower, said tilting tray having a sheet loading surface for carrying the sheet-feeding-direction leading end of sheets;

a sheet feeding unit having sheet feeding means for feeding sheets off said sheet feeding tray and said tilting tray;

support means for supporting the sheet-feeding-direction downstream end of said sheet feeding tray in such a way as to enable pivoting, with respect to said sheet feeding unit, said tilting tray and said sheet feeding tray unitarily, between a roughly horizontal position in which sheets can be loaded onto the sheet loading surface of said sheet feeding tray, and a vertical position; and restraining means for restraining swinging action, in conjunction with the action of said sheet feeding tray pivoting into the vertical position, of the other end of said tilting tray different from the one end attached to said sheet feeding tray, wherein said restraining means has
- a restraining member provided on said sheet feeding tray, for restraining said tilting tray,
- an engaging member provided on said tilting tray, for engaging with said restraining member,
- a biasing member for biasing the restraining member toward, to engage it with, said engaging member, and
- a pressing member for pressing, in opposition to said biasing member, said restraining member in a direction in which said tilting tray parts from said engaging member, to release engagement of said restraining member with said engaging member; and when said sheet feeding tray is in the roughly horizontal position, said restraining member releases its engagement with said engaging member, and by said sheet feeding tray being pivoted from the roughly horizontal position to the vertical position, said restraining member engages with said engaging member, restraining movement of said tilting tray with respect to said sheet feeding tray.

5. The sheet feeding device according to claim 4, wherein:
said sheet feeding unit comprises cover member, provided below said tilting tray, for covering said sheet feeding means;
said sheet feeding tray is supported by said support means in such a way that a portion of said sheet feeding tray abuts against the cover member, to be retained in the predetermined roughly horizontal position; and
said pressing member is provided on the cover member, for retaining said sheet feeding tray in the roughly horizontal position.

6. The sheet feeding device according to claim 4, further comprising a housing tray provided beneath said sheet feeding tray, for housing sheets processed at the processing position.

* * * * *